(12) United States Patent
Blake

(10) Patent No.: US 9,134,131 B2
(45) Date of Patent: Sep. 15, 2015

(54) METHOD AND APPARATUS FOR DETERMINING ORIENTATION USING A PLURALITY OF ANGULAR RATE SENSORS AND ACCELEROMETERS

(75) Inventor: Erik Blake, Whitehorse, CA (US)

(73) Assignee: Icefield Tools Corporation, Whitehorse (CA)

( * ) Notice: Subject to any disclaimer, the term of this patent is extended or adjusted under 35 U.S.C. 154(b) by 749 days.

(21) Appl. No.: 13/441,765

(22) Filed: Apr. 6, 2012

(65) Prior Publication Data

US 2012/0259579 A1    Oct. 11, 2012

Related U.S. Application Data

(60) Provisional application No. 61/473,035, filed on Apr. 7, 2011.

(51) Int. Cl.
*E21B 47/024* (2006.01)
*G01C 21/16* (2006.01)

(52) U.S. Cl.
CPC .............. *G01C 21/16* (2013.01); *E21B 47/024* (2013.01)

(58) Field of Classification Search
CPC ..................................................... E21B 47/024
USPC ........................................................ 702/151
See application file for complete search history.

(56) References Cited

U.S. PATENT DOCUMENTS

| | | |
|---|---|---|
| 3,753,296 A | 8/1973 | Van Steenwyk |
| 3,894,341 A | 7/1975 | Kapeller |
| 4,197,654 A | 4/1980 | Van Steenwyk |
| 4,265,028 A | 5/1981 | Van Steenwyk |
| 4,433,491 A | 2/1984 | Ott |
| 4,468,863 A | 9/1984 | Van Steenwyk |
| 4,471,533 A | 9/1984 | Van Steenwyk |
| 4,472,884 A | 9/1984 | Engebretson |
| 4,559,713 A | 12/1985 | Ott |
| 5,194,872 A | 3/1993 | Musoff |
| 5,432,699 A | 7/1995 | Hache |
| 6,347,282 B2 | 2/2002 | Estes |
| 6,421,622 B1 | 7/2002 | Horton |
| 6,441,779 B1 * | 8/2002 | Bennett et al. ........... 342/357.36 |
| 6,529,834 B1 | 3/2003 | Estes |
| 7,412,775 B1 | 8/2008 | Karnick |
| 7,813,878 B2 | 10/2010 | Estes |
| 2002/0169578 A1* | 11/2002 | Yang ............................ 702/152 |
| 2005/0126022 A1 | 6/2005 | Hansberry |
| 2011/0285590 A1* | 11/2011 | Wellington .................. 342/417 |
| 2012/0166082 A1* | 6/2012 | Fortier .......................... 701/504 |
| 2013/0092785 A1* | 4/2013 | Tournes et al. ................ 244/3.2 |

FOREIGN PATENT DOCUMENTS

WO            01/57474 A1      8/2001

* cited by examiner

*Primary Examiner* — Bryan Bui
(74) *Attorney, Agent, or Firm* — Christensen O'Connor Johnson Kindness PLLC

(57) ABSTRACT

A method and apparatus for determining the orientation of an object relative to a coordinate system. The apparatus includes a body providing a reference for a local coordinate system. A rotatable sensor array is provided having more than one sensor and a rotational axis about which the rotatable sensor array rotates. A rotational drive system is provided for rotating the rotatable sensor array both to precise positions relative to the local coordinate system and at a precise rate relative to the local coordinate system. An angular position indicator to measure the angular position of the rotatable sensor array.

17 Claims, 3 Drawing Sheets

METHOD AND APPARATUS FOR DETERMINING ORIENTATION USING A PLURALITY OF ANGULAR RATE SENSORS AND ACCELEROMETERS

FIELD

There is described a method and apparatus for determining the orientation of an object relative to a geographical coordinate system.

BACKGROUND

Any apparatus can be assigned a local three-dimensional coordinate system. For example, a rectangular brick can be assigned a local Cartesian coordinate system that describes its length, width and height relative to a specific corner of the brick. The rotational orientation of the apparatus' local coordinate system with respect to a geographical coordinate system is defined by a quaternion. The quaternion gives the direction of the rotation axis and the magnitude of the rotation.

This apparatus is used to determine this rotation quaternion. The apparatus requires that three conditions be satisfied: (1) a gravitational field must be present (2) the apparatus must be non-moving in the geographical coordinate system, and (3) the geographical coordinate system must be a non-inertial rotating coordinate system. An example satisfying all conditions would be determining the orientation of an apparatus placed stationary on or beneath the Earth's surface.

Applications for this apparatus include determining the orientation of instruments placed on the ocean floor by remotely-operated vehicles and determining the inclination and azimuth of instruments placed in boreholes that are drilled into the Earth's surface. Borehole inclinometers have applications in the mining, geotechnical, and petroleum industries to determine the trajectory of boreholes in the ground. They are also used to determine the orientation of various subsurface mechanisms such as directional drilling motors, kick-off wedges, and core orientation systems. Typically, such an instrument is moved through the borehole with centralizing mechanisms to keep its long axis aligned with the borehole; measurements of borehole orientation are made at depth intervals and then an interpolation scheme, of which many exist as prior art, is used to compute a trajectory for the borehole.

To compute the rotation quaternion, the apparatus must make measurements of two independent geographical reference vectors. Such vectors have a known magnitude and direction for any given location on the Earth's surface. The three available reference vectors are gravity, the Earth's magnetic field, and the Earth's axial spin.

Measuring the gravitational acceleration vector is straightforward using one or more accelerometers, and is prior art. Measuring the Earth's magnetic field is also straightforward using one or more magnetic sensors having directional sensitivity. A problem with using the magnetic field arises when the Earth's magnetic field is distorted by the presence of nearby magnetic material (e.g., magnetic rock or steel structures). These disturbances introduce errors in the computed apparatus orientation. Undisturbed measurements of the Earth's magnetic field together with measurements of the acceleration vector to determine relative orientation is prior art.

Measuring the Earth's rotation vector is not straightforward and is the subject of many patents. The signal is reliable, but small. The maximum signal strength is 15°/hour, or approximately 0.004°/s—an angular rate sensor must be able to resolve a small fraction of this maximum value in order to be useful. Historically, sensors capable of directly measuring the Earth rotation signal have been expensive, and some are sensitive to mechanical shock or vibration. In recent years, the development of FOG (fibre-optic gyros) and MEMS (micro-electrical machined structure) angular rate sensors has brought the promise of inexpensive, rugged sensors capable of measuring Earth rotation. Unfortunately, some of these sensors exhibit sensitivity to linear acceleration (e.g., gravity) so that for small signals, it may be difficult to discriminate between linear acceleration and angular rotation.

The use of accelerometers to measure the direction and magnitude of the Earth's gravitational field in the local coordinate system is well known, as is the use of magnetometers to measure the Earth's magnetic field. U.S. Pat. No. 5,194,872 teaches reversing the sensor package to remove sensor offset bias. U.S. Pat. No. 7,813,878 uses misalignment plus rotation about the Z-axis to determine tool face orientation. Similar teachings can be found in U.S. Pat. No. 6,347,282 and U.S. Pat. No. 6,529,834. U.S. Pat. No. 7,412,775 uses a rotating table, rotating on a vertical axis, and a single MEMS gyro to determine North by looking at phase relationship. Similar teachings can be found in U.S. Pat. No. 3,753,296. U.S. Pat. No. 4,433,491, U.S. Pat. No. 3,753,296, and U.S. Pat. No. 3,894,341—rotate mechanical gyros to find maximum signal strength, on the premise that at maximum signal strength the heading must be aligned with North (Earth rotation axis). U.S. Pat. No. 5,432,699 uses orthogonal sensors and two sets of measurements separated in time and position of the apparatus to compensate for motion of the apparatus. This is a patent discussing how to correct for unwanted, but unavoidable, motion of the apparatus. U.S. Pat. Nos. 4,472,884, 4,471,533, 4,468,863, 4,559,713, 4,265,028, and 4,197,654 all use a canted gyro sensor together with rotation to permit measurement of rotation on a plurality of axes using only one sensor.

SUMMARY

According to one aspect, there is provided an apparatus for determining the orientation of an object relative to a coordinate system. The apparatus includes a body providing a reference for a local coordinate system. A rotatable sensor array is provided having more than one sensor and a rotational axis about which the rotatable sensor array rotates. A rotational drive system is provided for rotating the rotatable sensor array both to precise positions relative to the local coordinate system and at a precise rate relative to the local coordinate system. An angular position indicator to measure the angular position of the rotatable sensor array. Values measured in the local coordinate system are used to compute a rotation quaternion required to rotate the local coordinate system into the geographical coordinate system.

According to another aspect, there is provided a method for determining the orientation of an object relative to a coordinate system. A first step is provided of rotating sensor array with the precise rotational position relative to a local coordinate system and a precise rotational rate relative to the local coordinate system being known. A second step is provided of using sensor data from the rotating sensor array to produce an overdetermined system of equations that can be solved for the unknown direction of the Earth rotation vector $\hat{\omega}$. A third step involves solving, with a measure of the gravity vector $\hat{g}$, the rotation quaternion describing the orientation of the apparatus in the coordinate system. A final step involves using values of $\hat{g}$ and $\hat{\omega}$, measured in the local coordinate system to compute the rotation quaternion required to rotate the local coordinate system into the geographical coordinate system.

Although beneficial results may be obtained through use of the method and apparatus described above, it is useful to have a reference for data verification. Even more beneficial results may, therefore, be obtained when a non-rotatable sensor array is also provided.

There will hereinafter be described further information regarding the method and apparatus and types of sensors that can be used in both the rotatable sensor array and the non-rotatable sensor array to achieve the best results. Beneficial results may be obtained when the rotatable sensor array includes three or more angular rate sensors, with at least three of the angular rate sensors being mounted with their sensitive axes grossly misaligned with the rotation axis of the rotatable sensor array. Even more beneficial results may be obtained when the rotatable sensor array contains two or three accelerometers. Where two accelerometers are used, their sensitive axes should be arranged perpendicular to each other and perpendicular to the rotational axis of the rotatable sensor array. Where accelerometers are used, their sensitive axes should be arranged perpendicular to each other and with one sensitive axis parallel to the rotation axis of the rotable sensor array. Even more beneficial results may be obtained through the use of a three-component magnetometer. Finally, it is beneficial to have a temperature sensor, as temperature influences readings from some sensors and adjustments may be required for temperature to ensure accuracy.

There are various ways in which the data received from the sensors may be handled. One option is to use a transmitter to transmit data from the sensors and the angular position indicator to a monitoring station. Another option is to provide a memory to record and store data from the sensors and the angular position indicator. A final option is to have a processor that performs calculations prior to either transmitting or recording and storing in memory data from the sensors and angular position indicator. It will be appreciated that due to transmission disruptions in hostile environments, data from the sensors and angular position indicator may be stored in memory for intermittent transmission to a monitoring station.

BRIEF DESCRIPTION OF THE DRAWINGS

These and other features will become more apparent from the following description in which reference is made to the appended drawings, the drawings are for the purpose of illustration only and are not intended to be in any way limiting, wherein.

DETAILED DESCRIPTION

A method and apparatus will now be described with reference to FIGS. 1 through 3.

Figure 1:
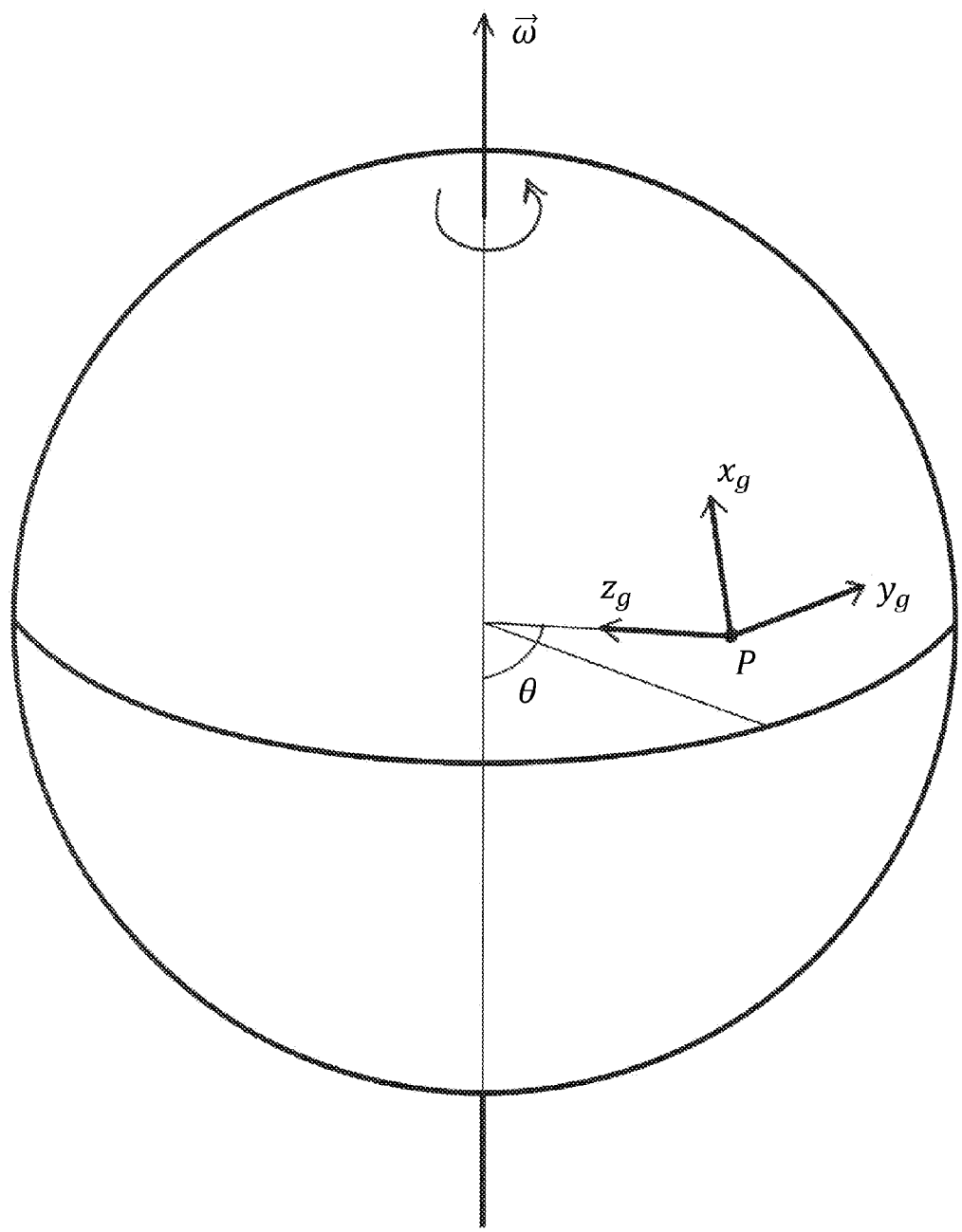
FIG. 1 is an illustration of a geographical coordinate system.

In FIG. 1, we define the geographical coordinate system. For a point P on the Earth's surface, the axis $x_G$ points north, $y_G$ points north, and $z_G$ points down along the gravitational acceleration vector. The latitude $\theta$ of the point P is known. The vector $\vec{\omega}$ represents the rotation of the Earth. Unit vectors $\hat{\omega}$ and $\hat{g}$ represent the unit Earth rotation and gravity vectors respectively, such that $\cos(\theta)=\hat{\omega}\cdot\hat{g}$. Note that $\hat{g}$ is by definition parallel to the $z_G$ axis.

Figure 2:
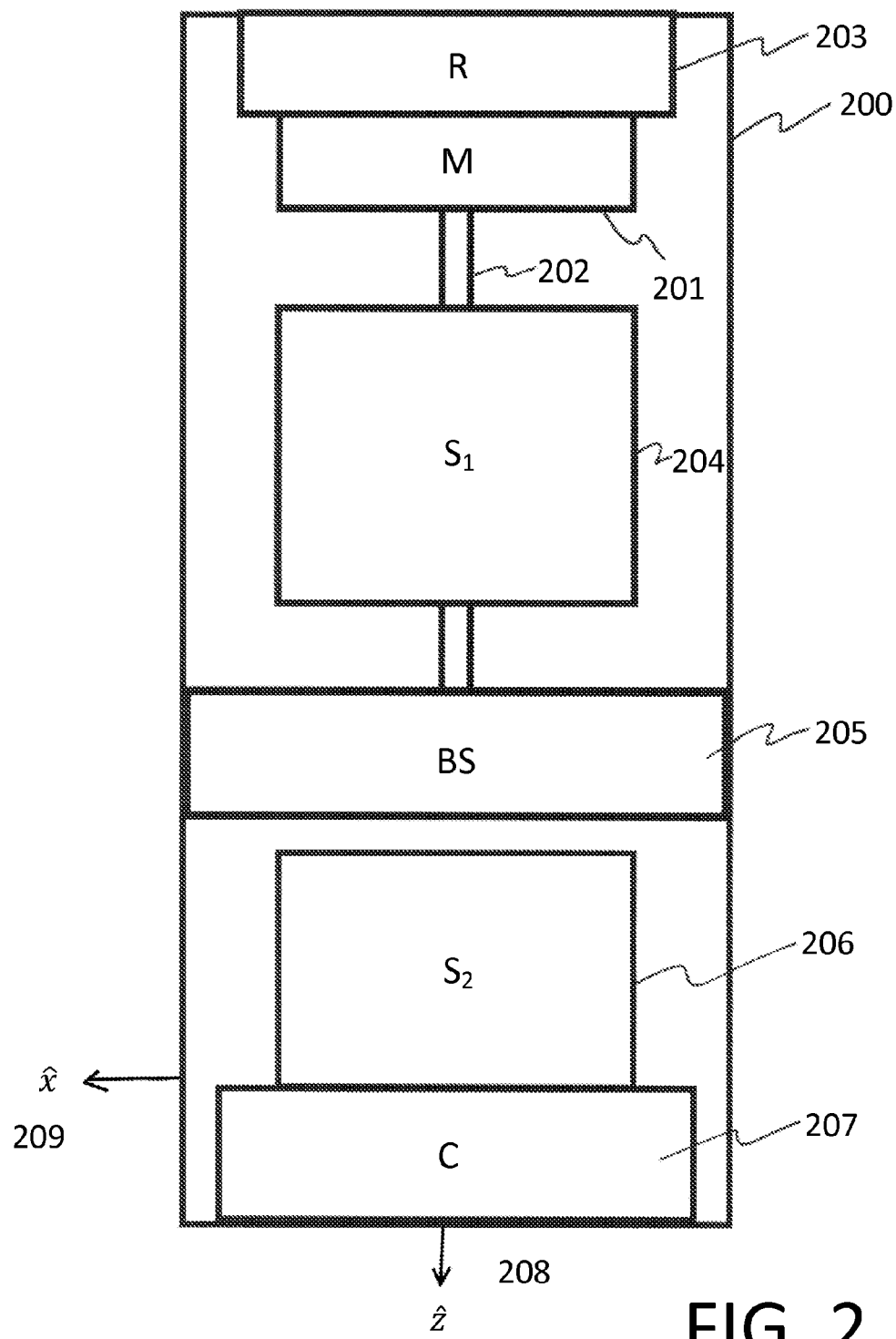
FIG. 2 is a side elevation view, in section, of an apparatus for determining orientation of an object relative to a geographical coordinate system

FIG. 2 shows the apparatus housing 200 containing a motor 201 driving an axle 202. If necessary, the housing 200 may be designed to withstand extremes of pressure and/or temperature. For example, the housing may consist of a dual-wall vacuum flask to reduce conduction of heat into the housing. Mounted on the axle is an angular position resolver 203 and a rotatable sensor package 204. There exists a "zero" position for the angular position resolver from which all rotation angles are measured. The shaft is supported by a bearing 205, which may also contain a slip-ring to carry power and signals to and from the sensor package, if the degree of rotation by motor 201 is too great to permit a wire connection. The resolver 203 may be collocated with the bearing 205 rather than with the motor 201 as shown. A non-rotating sensor package 206 is fixed to the housing 200. A microprocessor 207 capable of receiving and recording signals from the sensor packages 204 and 206, and the angular resolver 203 is located in the housing. The microcontroller can also control and drive the motor 201, and may gather data from the rotatable sensor package 204 using a wireless interface.

The local Cartesian coordinate system of the housing 200 defines the $\hat{z}$ axis 208 pointing along the rotation axis of axle 202. The $\hat{x}$ axis 209 is at right angles to the $\hat{z}$ axis and extends through a reference mark placed on the housing 200. The $\hat{y}$ axis is not shown, but is orthogonal to both the $\hat{x}$ and $\hat{z}$ axes and follows the right-hand rule.

The non-rotating sensor package 206 contains three accelerometers mounted orthogonally to each other. Their sensitive axes are parallel to the housing coordinate system, or at some known angle to them. A calibration process determines the true orientation of the accelerometer sensitive axes and can be used to compute the value of $\hat{g}$ in the housing coordinate system $(\hat{x},\hat{y},\hat{z})$.

One of the accelerometers may be omitted. For example, if the apparatus is to be operated in a near-vertical position (z within approximately 30° of $\hat{g}$), then the accelerometer whose sensitive axis is parallel to the $\hat{z}$ axis may be omitted.

The non-rotating sensor package may also contain three orthogonally-mounted magnetometers. As with the accelerometers, their sensitive axes are parallel to the housing coordinate system, or at some known angle to them. The magnetometers may be used to measure the Earth's magnetic field direction and magnitude. If there is no disturbance of the Earth's magnetic field, then these measurements, together with measurements of gravitational acceleration, can be used to compute the quaternion. This method is well known in prior art.

Alternatively, the accelerometers and/or magnetometers may be located in the rotating sensor package. This permits making more accurate measurements of acceleration and magnetic field, particularly along the $\hat{x}$ and $\hat{y}$ axes, by subtracting readings taken at two positions 180° in rotation apart. This prior art method removes offset bias from the sensors.

Figure 3:
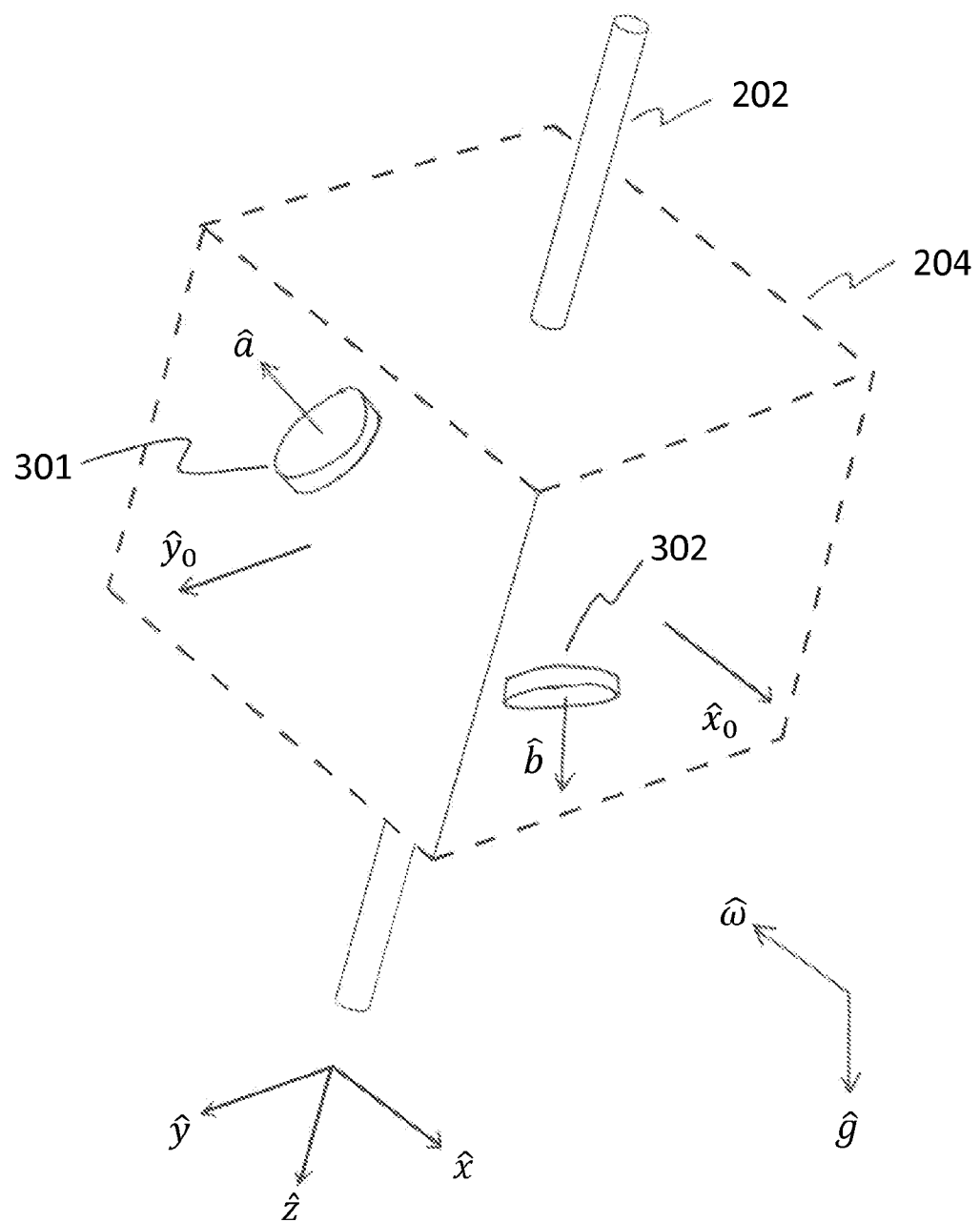
FIG. 3 is a perspective view of a rotatable sensor package from the apparatus of FIG. 2.

FIG. 3 shows a view of the rotatable sensor package 204. When the axle 202 is positioned at its defined zero position, the local coordinate system $(\hat{x}_0,\hat{y}_0,\hat{z})$ of the rotatable sensor package 204 are aligned with the housing coordinate system $(\hat{x},\hat{y},\hat{z})$. The subscript "0" denotes the zero angle position. Note that as the rotatable package is turned about the axle 202, the z axis remains common to both the housing and rotating sensor package coordinate system.

Within the rotatable sensor housing are located at least three angular rate sensors and a temperature sensor. Two such sensors are shown in the figure. Rate sensor 301 has an axis of sensitivity $\hat{a}$, and rate sensor 302 has an axis of sensitivity $\hat{b}$.

The general sensitive axis $\hat{n}$ of a given angular rate sensor may be aligned with the rotatable sensor package coordinate system $(\hat{x}_0, \hat{y}_0, \hat{z})$, but at least three of the angular rate sensors must be misaligned with respect to the rotatable sensor package coordinate system and are not arrange perpendicularly or orthogonally with respect to one another. This is so that rotations applied to the axle 202 will produce a signal in the angular rate sensor and the z-terms in equations (2) and (3) below are not reduced to zero.

The vectors $\hat{g}$ and $\hat{\omega}$ are shown, with k pointing straight down and $\hat{\omega}$ pointing in a direction predicated by the latitude of P and the orientation of the apparatus. The housing coordinate system $(\hat{x}, \hat{y}, \hat{z})$ is also shown.

The signal from any given angular rate sensor n, positioned at angular position m is given by $$S_m^n = W_n \hat{n}_m \cdot \hat{\omega} + G_n \hat{n}_m \cdot \hat{g} + T_n \quad (1)$$

where $\hat{n}_m$ is the unit vector denoting the axis of sensitivity for rotation angle m, expressed in the housing coordinate system $(\hat{x}, \hat{y}, \hat{z})$, $W_n$ is the scale factor sensitivity for rate sensor n, $G_n$ is the linear acceleration sensitivity of the rate sensor, and $T_n$ is a combined offset and error term for the angular rate sensor. $T_n$ may have temperature dependence. $G_n$ may be a function of $\hat{g}$, but this added complexity can be accommodated by careful sensor calibration and modelling of the sensitivity when solving the system of equations we are developing. Note also that $W_n$ may be a function of temperature.

The temperature sensor (not shown in FIG. 3) is used during calibration and operation to characterize the temperature-dependence of $T_n$ and $W_n$.

Expanding equation (1) for the zero position where $\hat{x}_0 = \hat{x}$, $\hat{y}_0 = \hat{y}, \hat{z}_0 = \hat{z}$ (and hence $\hat{n}_0 = \hat{n}$), we get $$S_0^n = W_n(n_x \omega_x + n_y \omega_y + n_z \omega_z) + G_n(n_x g_x + n_y g_y + n_z g_z) + T_n. \quad (2)$$

With a single set of such measurements from the various angular rate sensors, it is difficult to reliably solve for $\hat{\omega}$, unless the second term is relatively small and the behaviour of $G_n$ well described. This is, unfortunately, not the case for currently-available MEMS angular rate sensors.

If we now rotate the sensor housing 202, for example by 180 degrees, and take measurements again, the rotatable sensor package and housing coordinate systems are related by $\hat{x}_{180} = -\hat{x}, \hat{y}_{180} = -\hat{y}$, and $z_{180} = \hat{z}$. Because the $\hat{z}$-axis does not reverse, only the terms related to the x and y axes change sign. Thus, the equation now expands to $$S_{180}^n = W_n(-n_x \omega_x - n_y \omega_y + n_z \omega_z) + G_n(-n_x g_x - n_y g_y + n_z g_z) + T_n. \quad (3)$$

As long as the sensitive axes of the angular rate sensors have non-zero values of $n_z$ (in other words, the sensitive axes are misaligned with respect to the $\hat{x}$ and $\hat{y}$ axes), then the values of $S_0^n$ and $S_{180}^n$ are not symmetrical and they contain non-redundant information.

Measurements of $S_m^n$ may be made at a plurality of rotation angles m. For a total of N angular rate sensors and measurements made at M angle positions, a total of N×M equations are formed. For this system of equations, the values of h are known from calibration, $\hat{g}$ is known from the accelerometer measurements, $W_n$ and $T_n$ are known from calibration (but may have temperature scaling effects that are difficult to describe during apparatus calibration), and $G_n$ may be only partly characterized during calibration.

It is possible to calibrate the values $W_n$ in-situ by rotating the rotatable sensor package at a constant rate in both directions. Because the applied rotation rate is known, and it is applied in both directions, the contribution of $\vec{\omega}$ to the measured signal is cancelled, and $W_n$ can be quantified accurately.

Again, this process works only if the sensitive axes $\hat{n}$ are misaligned with respect to the $\hat{x}$ and $\hat{y}$ axes.

The unknowns are the three components of $\hat{\omega}$. The N×M equations form an overdetermined system of equations that can be solved for $\hat{\omega}$ using a number of prior art methods. If the latitude of operation $\theta$ is known, then the constraint $\cos(\theta) = \hat{\omega} \cdot \hat{g}$ can be added to the system of equations. Possible methods to solve the equations include the least squares method and the amoeba minimization method.

Once values of $\hat{g}$ and $\hat{\omega}$, measured in the local apparatus coordinate system $(\hat{x}, \hat{y}, \hat{z})$, it is straightforward to compute the rotation quaternion required to rotate the $(\hat{x}, \hat{y}, \hat{z})$ system into the geographical coordinate system $(\hat{x}_G, \hat{y}_G, \hat{z}_G)$. In the case of a borehole survey instrument, the user will be interested in the inclination and azimuth of the long axis, or $\hat{z}$-axis, expressed in terms of inclination and azimuth with respect to North (the $x_G$-axis), which is a simple trigonometric solution. Toolface, or roll orientation, can similarly be computed by examining the position of the instrument $\hat{x}$-axis in the geographical coordinate system.

In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be one and only one of the elements.

The following claims are to be understood to include what is specifically illustrated and described above, what is conceptually equivalent, and what can be obviously substituted. Those skilled in the art will appreciate that various adaptations and modifications of the described embodiments can be configured without departing from the scope of the claims. The illustrated embodiments have been set forth only as examples and should not be taken as limiting the invention. It is to be understood that, within the scope of the following claims, the invention may be practiced other than as specifically illustrated and described.

What is claimed is:

1. An apparatus for determining the orientation of an object relative to a geographical coordinate system, comprising:
    a body providing a reference for a local coordinate system;
        a rotatable sensor array having more than one sensor and a rotational axis about which the rotatable sensor array rotates with respect to the local coordinate system;
        a rotational drive system for rotating the rotatable sensor array both to precise positions relative to the local coordinate system and at a precise rate relative to the local coordinate system; and
        an angular position indicator to measure the angular position of the rotatable sensor array, whereby values measured in the local coordinate system are used to compute a rotation quaternion required to rotate the local coordinate system into the geographical coordinate system.

2. The apparatus of claim 1, wherein the rotatable sensor array includes three or more angular rate sensors, at least three of the angular rate sensors being mounted with their sensitive axes grossly misaligned with the rotational axis of the rotatable sensor array.

3. The apparatus of claim 2, wherein the rotatable sensor array contains two or three accelerometers.

4. The apparatus of claim 3, wherein two accelerometers are used with their sensitive axes arranged perpendicular to each other and perpendicular to the rotational axis of the rotatable sensor array.

5. The apparatus of claim 3, wherein three accelerometers are used with their sensitive axes arranged perpendicular to each other and with one sensitive axis parallel to the rotational axis of the rotatable sensor array.

6. The apparatus of claim 2, further comprising a temperature sensor that records an ambient temperature.

7. The apparatus of claim 1, wherein the body includes a non-rotatable sensor array.

8. The apparatus of claim 7, wherein the non-rotatable sensor array contains two or three accelerometers.

9. The apparatus of claim 8, wherein the non-rotatable sensor array has two accelerometers with their sensitive axes arranged perpendicular to each other and perpendicular to the rotational axis of the rotatable sensor array.

10. The apparatus of claim 8, wherein the non-rotatable sensor array has three accelerometers with their sensitive axes arranged perpendicular to each other and with one sensitive axis parallel to the rotational axis of the rotatable sensor array.

11. The apparatus of claim 8, wherein the non-rotatable sensor array contains a three-component magnetometer.

12. The apparatus of claim 8, further comprising a temperature sensor that records an ambient temperature.

13. The apparatus of claim 1, wherein the rotatable sensor array contains a three-component magnetometer.

14. The apparatus of claim 1, wherein memory is provided to record and store data from the sensors and the angular position indicator.

15. The apparatus of claim 1, further comprising a processor capable of providing an in-situ scale factor calibration.

16. A method for determining the orientation of an object relative to a geographical coordinate system, comprising:

providing a rotating sensor array with a precise rotational position relative to a local coordinate system and a precise rotational rate relative to the local coordinate system being known;

using sensor data from the rotating sensor array to produce an overdetermined system of equations that can be solved for the unknown direction of the Earth rotation vector $\hat{\omega}$;

solving, with a measure of the gravity vector $\hat{g}$, a rotation quaternion describing the orientation of the rotating sensor array in the local coordinate system; and using values of $\hat{g}$ and $\hat{\omega}$, measured in the local coordinate system to compute a rotation quaternion required to rotate the local coordinate system into the geographical coordinate system.

17. The method of claim 16, wherein the rotating sensor array includes at least three angular rate gyro sensors positioned in at least three different orientations relative to a rotational axis of the rotating sensor array.

* * * * *